I. L. JOSLYN.
TIRE ARMOR OR PROTECTOR.
APPLICATION FILED FEB. 15, 1917.

1,258,780.

Patented Mar. 12, 1918.

WITNESSES

INVENTOR
Ida Lena Joslyn.
BY
ATTORNEY

UNITED STATES PATENT OFFICE.

IDA LENA JOSLYN, OF TERRE HAUTE, INDIANA.

TIRE ARMOR OR PROTECTOR.

1,258,780.　　　　　Specification of Letters Patent.　　Patented Mar. 12, 1918.

Application filed February 15, 1917. Serial No. 148,836.

*To all whom it may concern:*

Be it known that I, IDA LENA JOSLYN, a citizen of the United States, residing at Terra Haute, in the county of Vigo and State of Indiana, have invented certain new and useful Improvements in Tire Armors or Protectors, of which the following is a specification.

This invention relates to improvements in tire armors or protectors.

The object of the invention is to provide a light, flexible and efficient device of this character which will operate also as an antiskidding device.

Another object is to provide a device of this character which may be quickly applied and removed with very little effort.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
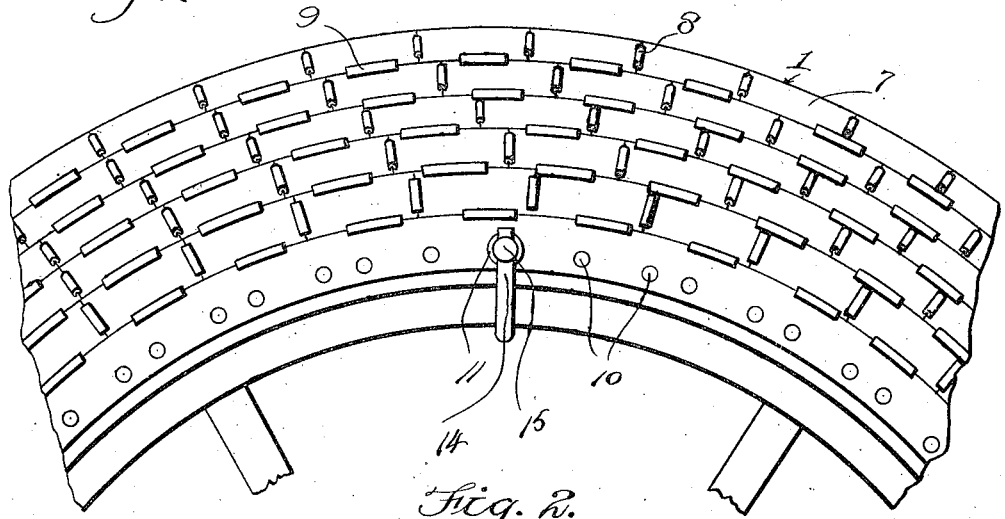
Figure 2:
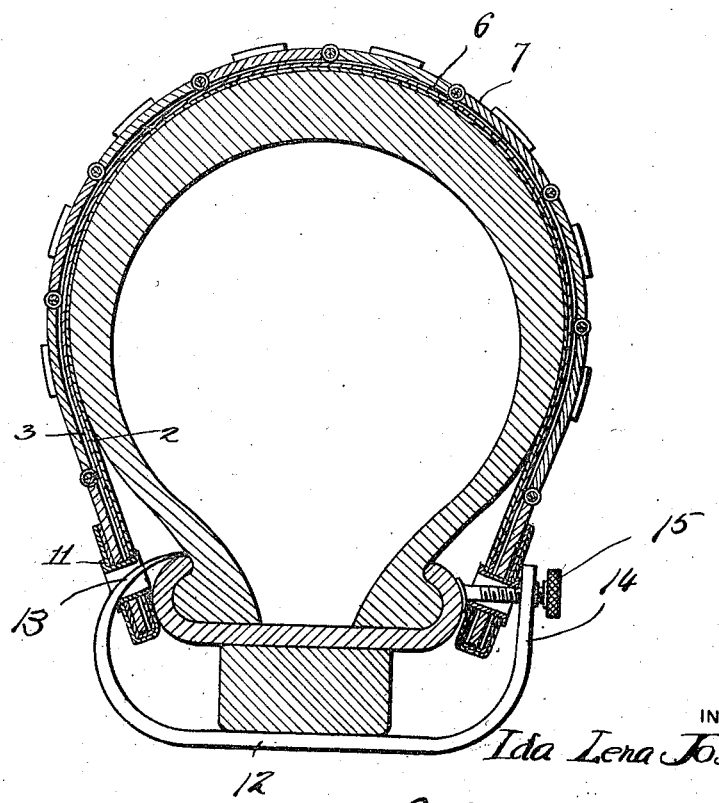

In the accompanying drawing:

Figure 1 represents a side elevation of a portion of a wheel equipped with this improved armor, and Fig. 2 is a transverse vertical section thereof.

The armor 1 constituting this invention may be constructed for use on shoes or tires of different sizes.

In constructing a protective shield or armor in accordance with this invention two strips 2 and 3 of chamois skin, lamb skin or other suitable flexible material are arranged in superposed relation, said strips being of the same width and length. After being so arranged, the side edges of the two strips are secured together in any suitable manner. After these strips 2 and 3 have been secured together along their side edges, their ends are connected preferably by arranging them in overlapping relation and stitching them together to form a double-lapped seam, although obviously they may be connected in any other manner capable of providing a flat joint. By so connecting these strips, an annular covering conforming in configuration to the tire on which it is to be used is produced and which constitutes a lining or base 6 for the armor.

Secured to this flexible base 6 are a plurality of comparatively thin, steel links 7. These links are preferably in the form of rectangular plates and are arranged lengthwise peripherally around the base 6, peripheral rows being here shown and the links of which are connected in a manner to be described. These links 7 have their adjacent ends connected by link connectors 8 cylindrical in form as shown in Figs. 1 and 2, which are substantially $\frac{1}{2}''$ in length and preferably composed of steel. In forming the outer shield or member of the tire armor, the links 7 are arranged in longitudinal alinement around the center of the periphery of the base 6 and the ends thereof flexibly joined by the steel connectors 8 which may be applied in any suitable manner. Another row composed of links is arranged on one side of the row just described and the ends of the said links connected similarly to those of the other row. Similar rows are constructed, each corresponding row being composed of two links less than the one adjacent its inner edge to adapt the armor to conform to the curvature of the tire when applied. After these rows are formed, the side edges of the links of adjacent rows are connected by steel link connectors 9, similar in construction to the connectors 8 used for connecting the ends of the links and similarly applied. The connected links are then placed around the outer face of said base and the side edges of the base turned over the side edges of the links and riveted thereto by tubular rivets indicated at 10, two rivets being used for each link as is shown clearly in Fig. 1. These rivets are used in all of the links except those which are to carry the attaching means for the armor, three being preferably used and in which are mounted eyelets 11; the eyelets in one side edge of the armor are arranged diametrically opposite those in the other side to receive clamps as 12, which are designed to pass around the rim of the wheel and each has a hook-shaped end 13 and an apertured end 14. The hooked ends 13 are designed to pass through eyelets 11 on one edge of the armor and fit snugly around the curved edges of the rim, as is shown clearly in Fig. 2, while set screws as 15 extend through the apertured ends and secure said clamps in operative engagement.

In the use of this improved armor, the base 6 carrying the outer metallic protective member is fitted over the shoe when deflated and the clamps 12 placed in operative engagement therewith.

The tire is then inflated and the wheel is ready for use.

The link connectors 8 and 9 are here shown tubular in form and project outwardly beyond the face of the links in planes at right angles to each other, thereby adapting them to operate as anti-skidding devices as well as connectors and are arranged out of alinement transversely.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

A tire armor comprising a flexible base, an imperforate outer member formed of flexibly connected elements, said outer member being of less width than said base with the side edges of the base folded over the side edges of said outer member and riveted thereto, eyelets in the connected edges of said base and outer member, and means for passage through the eyelets in the opposed edges of the armor to hold it in operative position.

In testimony whereof I affix my signature in presence of two witnesses.

IDA LENA JOSLYN.

Witnesses:
BAZIL BROWN,
I. N. SWEET.